UNITED STATES PATENT OFFICE 2,015,204

WATER-INSOLUBLE AZO-DYESTUFF AND FIBER DYED THEREWITH

Hans Thomae, Frankfort-on-the-Main, August Modersohn, Cologne - Mulheim-on-the-Rhine, Fritz Müller, Frankfort-on-the-Main, and Friedrich Muth, Leverkusen-I. G. Werk, Germany, assignors to General Aniline Works, Inc., New York, N. Y., a corporation of Delaware No Drawing. Application November 19, 1932, Serial No. 643,528. In Germany November 24, 1931

10 Claims. (Cl. 260—95)

The present invention relates to water-insoluble azo-dyestuffs and to fiber dyed therewith, more particularly it relates to dyestuffs corresponding to the following general formula:

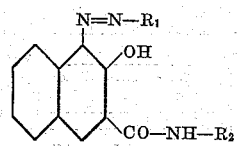

wherein $R_1$ represents a radical of the benzene or naphthalene series which is substituted in o-position to the azo group by an alkylsulfonyl or aralkylsulfonyl group and which may be further substituted by halogen, alkyl, a $CF_3$ or sulfonic acid-dialkylamino group, and $R_2$ represents a radical of the benzene or naphthalene series.

We have found that valuable azo-dyestuffs are obtainable by coupling a diazo compound of o-aminoaryl-alkylsulfones, o - aminoaryl-aralkylsulfones or of a substitution product thereof, in substance, on the fiber or on any of the usual substrata adapted for the production of lakes, with an arylide of 2.3-hydroxynaphthoic acid, such dyestuff components, however, being excluded which contain groups that would render the dyestuffs soluble in water as, for instance, the sulfonic acid or the carboxylic acid group.

The dyestuffs, obtainable according to this invention, yield on the fiber orange dyeings which, for the greatest part, are distinguished by a yellowish tint which, hitherto, could not be obtained with arylides of 2.3-hydroxynaphthoic acid. The dyeings are distinguished by good fastness properties, particularly by a good fastness to ironing and to light. The present invention represents a valuable technical enrichment.

The following examples serve to illustrate the invention, but they are not intended to limit it thereto, the parts being by weight unless otherwise stated:

(1) 50 grams of boiled cotton yarn are treated for half-an-hour in 1 liter of the grounding liquor, squeezed or hydro-extracted and dyed in the developing bath while wet. The material is then rinsed, soaped at the boil and dried.

(a) *Grounding liquor*

3.5 grams of 2'3'-hydroxynaphthoyl-1-amino-2-methyl-4-chlorobenzene are dissolved with
20 cc. of Turkey red oil of 50% strength and
10 cc. of caustic soda solution of 34° Bé.;
3.5 cc. of formaldehyde of 30% strength are added thereto and the whole is made up with water to
1 liter.

(b) *Developing bath*

1.71 grams of 1-aminophenyl-2-methylsulfone are diazotized in the cold with
3.1 cc. of hydrochloric acid of 20° Bé. and
8.0 cc. of sodium nitrite solution of 10% strength.

The diazo-solution is neutralized by means of 10 grams of sodium acetate and, after addition of 25 to 50 grams of sodium chloride, made up with water to 1 liter.

A vivid orange of good fastness properties, especially of very good fastness to light, is obtained.

The dyestuff corresponds with the following formula:

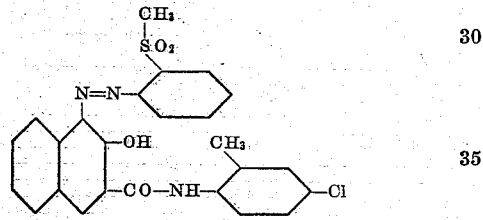

(2) (a) *Grounding liquor*

5 grams of 2'3'-hydroxynaphthoyl-1-amino-4-methoxybenzene are dissolved with
10 cc. of Turkey red oil of 50% strength and
10 cc. of caustic soda solution of 34° Bé.;
35 cc. of formaldehyde of 30% strength are added thereto and the whole is made up with water to
1 liter.

(b) *Developing bath*

2.4 grams of 1-amino-5-trifluoromethyl-phenyl-2-methyl-sulfone are diazotized in the usual manner. The diazo-solution is neutralized by addition of sodium acetate; sodium chloride is added and the whole is made up with water to 1 liter.

A vivid golden-yellow of good fastness properties is obtained.

The dyestuff corresponds to the following formula:

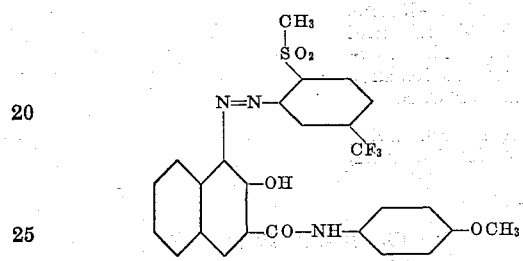

(3) A diazo solution is prepared in the usual manner by means of 17.1 parts of 1-aminophenyl-2-methylsulfone. This solution is run into an aqueous suspension prepared by dissolving 27.7 parts of 2'3'-hydroxynaphthoyl-1-amino-4-methyl benzene in alcoholic caustic soda solution, diluting the solution with water and neutralizing it by means of acetic acid. When the coupling is finished, the dyestuff is filtered by suction, washed until neutral and dried, and it is thus obtained in the form of an orange powder.

Dyestuffs of similar fastness properties are obtainable by substituting for the diazo-components, used in the foregoing examples, the corresponding substitution products. Instead of the coupling components mentioned in the examples, other arylides of 2.3-hydroxynaphthoic acid may be used.

The following table indicates a number of other combinations obtainable according to the present process but does not comprise all possibilities for the preparation of dyestuffs by using different components; it, therefore, is not intended to limit the invention to the dyestuffs mentioned therein.

| | Diazotizing component | Coupling component | Tint |
|---|---|---|---|
| 1 | 1-aminophenyl-2-methylsulfone | 2'3'-hydroxynaphthoyl-2-aminonaphthalene | Yellowish-orange. |
| 2 | ....do.... | 2'3'-hydroxynaphthoyl-1-amino-2-methoxy-4-chlorobenzene. | Do. |
| 3 | ....do.... | 2'3'-hydroxynaphthoyl-1-amino-2-methoxybenzene | Do. |
| 4 | ....do.... | 2'3'-hydroxynaphthoyl-1-amino-4-chlorobenzene | Do. |
| 5 | ....do.... | 2'3'-hydroxynaphthoyl-1-amino-2-methylbenzene | Do. |
| 6 | ....do.... | 2'3'-hydroxynaphthoyl-1-amino-4-methylbenzene | Do. |
| 7 | 1-aminophenyl-2-ethylsulfone | 2'3'-hydroxynaphthoyl-1-amino-2-methylbenzene | Do. |
| 8 | 1-amino-5-chlorophenyl-2-methylsulfone | ....do.... | Do. |
| 9 | ....do.... | 2'3'-hydroxynaphthoyl-1-amino-4-chlorobenzene | Do. |
| 10 | ....do.... | 2'3'-hydroxynaphthoyl-2-aminonaphthalene | Do. |
| 11 | 1-amino-5-trifluormethylphenyl-2-methylsulfone | 2'3'-hydroxynaphthoyl-1-amino-2-methylbenzene | Golden-yellow. |
| 12 | ....do.... | 2'3'-hydroxynaphthoyl-1-aminobenzene | Do. |
| 13 | ....do.... | 2'3'-hydroxyanphthoyl-1-amino-4-methylbenzene | Do. |
| 14 | ....do.... | 2'3'-hydroxynaphthoyl-1-amino-2-methyl-4-chlorobenzene | Golden-orange. |
| 15 | ....do.... | 2'3'-hydroxynaphthoyl-1-amino-4-chlorobenzene | Do. |
| 16 | ....do.... | 2'3'-hydroxyanphthoyl-1-amino-2-methoxy-5-chlorobenzene. | Do. |
| 17 | ....do.... | 2'3'-hydroxynaphthoyl-1-amino-2-methoxybenzene | Do. |
| 18 | ....do.... | 2'3'-hydroxynaphthoyl-2-aminonaphthalene | Do. |
| 19 | ....do.... | 2'3'-hydroxynaphthoyl-1-amino-2-methyl-5-chlorobenzene | Do. |
| 20 | ....do.... | 2'3'-hydroxynaphthoyl-1-amino-2-methyl-4-methyoxybenzene. | Orange. |
| 21 | 1-aminophenyl-2-n-butylsulfone | 2'3'-hydroxynaphthoyl-1-aminobenzene | Yellowish-orange. |
| 22 | 1-aminophenyl-2-benzylsulfone | ....do.... | Orange. |
| 23 | 2-aminonaphthyl-1-methylsulfone | ....do.... | Do. |
| 24 | 1-amino-5-chlorophenyl-2-ethylsulfone | 2'3'-hydroxynaphthoyl-1-amino-2-methylbenzene | Orange-yellow. |
| 25 | ....do.... | 2'3'-hydroxynaphthoyl-2-aminonaphthalene | Yellowish-orange. |
| 26 | 1-amino-5-chlorophenyl-2-n-propylsulfone | 2'3'-hydroxynaphthoyl-1-aminobenzene | Golden-orange. |
| 27 | ....do.... | 2'3'-hydroxynaphthoyl-1-amino-2-methylbenzene | Do. |
| 28 | ....do.... | 2'3'-hydroxynaphthoyl-1-amino-2-methyl-4-chlorobenzene | Do. |
| 29 | 1-amino-5-chlorophenyl-2-n-butylsulfone | 2'3'-hydroxynaphthoyl-1-aminobenzene | Golden-yellow. |
| 30 | ....do.... | 2'3'-hydroxynaphthoyl-1-amino-2-methylbenzene | Do. |
| 31 | 1-amino-5-chlorophenyl-2-benzylsulfone | 2'3'-hydroxynaphthoyl-1-aminobenzene | Yellowish-orange. |
| 32 | ....do.... | 2'3'-hydroxynaphthoyl-1-amino-2-methyl-4-chlorobenzene | Do. |
| 33 | 1-amino-4-chlorophenyl-2-methylsulfone | 2'3'-hydroxynaphthoyl-1-aminobenzene | Scarlet. |
| 34 | ....do.... | 2'3'-hydroxynaphthoyl-1-amino-4-chlorobenzene | Do. |
| 35 | 1-amino-5-methylphenyl-2-methylsulfone | 2'3'-hydroxynaphthoyl-1-amino-2-methoxybenzene | Yellowish-orange. |
| 36 | ....do.... | 2'3'-hydroxynaphthoyl-1-amino-4-chlorobenzene | Do. |
| 37 | 1-amino-5-methylphenyl-2-ethylsulfone | 2'3'-hydroxynaphthoyl-1-aminobenzene | Golden-orange. |
| 38 | ....do.... | 2'3'-hydroxynaphthoyl-1-amino-2-methyl-4-chlorobenzene | Yellowish-orange. |
| 39 | ....do.... | 2'3'-hydroxynaphthoyl-1-amino-2-methoxybenzene | Golden-yellow. |
| 40 | 1-amino-5-methylphenyl-2-n-butylsulfone | 2'3'-hydroxynaphthoyl-1-amino-2-methylbenzene | Golden-orange. |
| 41 | ....do.... | 2'3'-hydroxynaphthoyl-1-amino-2-methyl-4-chlorobenzene | Yellowish-orange. |
| 42 | ....do.... | 2'3'-hydroxynaphthoyl-1-amino-2-methyl-5-chlorobenzene | Do. |
| 43 | 1-amino-5-methylphenyl-2-benzylsulfone | 2'3'-hydroxynaphthoyl-1-amino-2-methyl-4-chlorobenzene | Golden-orange. |
| 44 | ....do.... | 2'3'-hydroxynaphthoyl-1-amino-4-methyoxybenzene | Orange. |
| 45 | 1-amino-5-trifluormethyl-phenyl-2-ethylsulfone | 2'3'-hydroxynaphthoyl-1-amino-2-methylbenzene | Golden-yellow. |
| 46 | ....do.... | ....do.... | Do. |
| 47 | ....do.... | 2'3'-hydroxynaphthoyl-1-amino-2-methyl-4-chlorobenzene | Do. |
| 48 | ....do.... | 2'3'-hydroxynaphthoyl-1-amino-4-chlorobenzene | Do. |
| 49 | ....do.... | 2'3'-hydroxynaphthoyl-1-aminobenzene | Golden-orange. |
| 50 | ....do.... | 2'3'-hydroxynaphthoyl-2-aminonaphthalene | Do. |
| 51 | 1-amino-5-chlorphenyl-2-(4'-methylbenzylsulfone) | 2'3'-hydroxynaphthoyl-1-aminobenzene | Do. |
| 52 | ....do.... | 2'3'-hydroxynaphthoyl-1-amino-2-methoxybenzene | Yellowish-orange. |
| 53 | ....do.... | 2'3'-hydroxynaphthoyl-1-amino-4-chlorobenzene | Orange. |
| 54 | 1-aminophenyl-2-(4'-methylbenzylsulfone) | 2'3'-hydroxynaphthoyl-1-amino-2-methoxybenzene | Golden-orange. |
| 55 | ....do.... | 2'3'-hydroxynaphthoyl-1-amino-2-methoxy-5-chlorobenzene. | Orange. |
| 56 | 1-aminophenyl-2-(3'4'-dichlorobenzylsulfone) | 2'3'-hydroxynaphthoyl-1-aminobenzene | Yellowish-orange. |
| 57 | ....do.... | 2'3'-hydroxynaphthoyl-1-amino-4-chlorobenzene | Orange. |
| 58 | 1-amino-2-methylsulfonylbenzene-5-sulfonic acid-dimethylamide. | 2'3'-hydroxynaphthoyl-1-aminobenzene | Do. |

Since an object of the present invention is to provide dyestuffs of good fastness properties, which dyestuffs are insoluble in water and alkalies, it is to be understood that the aromatic nuclei of the general formulae appearing in the appended claims do not contain any substituents which are known to render organic compounds soluble in water or alkalies and to tend to depreciate the fastness of the dyestuffs to alkalies. Substituents of this kind are, for instance, the sulfonic acid and the carboxylic acid group.

We claim:

1. The water-insoluble azo-dyestuffs of the following general formula:

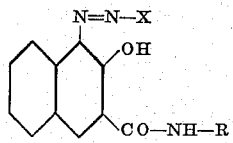

wherein X stands for the radical of a diazotized aromatic amine selected from the group consisting of 1-amino-5-chlorophenyl-2-alkyl-sulfone and 1 - amino - 5 - trifluormethylphenyl-2-alkyl-sulfone and R represents a radical of the benzene or naphthalene series, dyeing golden-yellow to orange shades and being distinguished by their good fastness properties, particularly by their good fastness to ironing and to light.

2. The water-insoluble azo-dyestuffs of the following general formula:

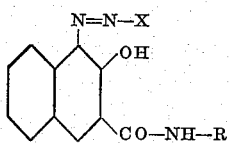

wherein X stands for the radical of a diazotized aromatic amine selected from the group consisting of 1-amino-5-chlorophenyl-2-methyl-sulfone and 1 - amino-5-trifluormethylphenyl-2-methyl-sulfone and R represents a radical of the benzene or naphthalene series, dyeing golden-yellow to orange shades and being distinguished by their good fastness properties, particularly by their good fastness to ironing and to light.

3. The water-insoluble azo-dyestuff of the following formula:

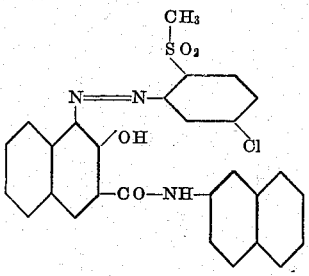

dyeing a yellowish-orange shade and being distinguished by its good fastness properties, particularly by its good fastness to ironing, to washing and to light.

4. The water-insoluble azo-dyestuff of the following formula:

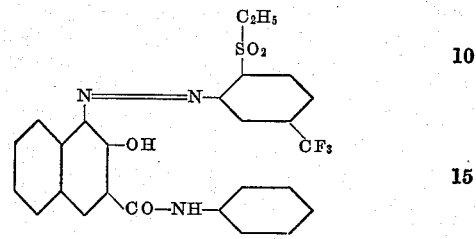

dyeing a golden-orange shade and being distinguished by its good fastness properties, particularly by its good fastness to ironing, to washing and to light.

5. The water-insoluble azo-dyestuff of the following formula:

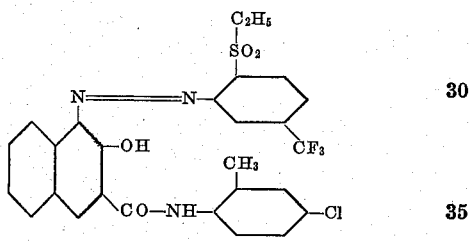

dyeing a golden-yellow shade and being distinguished by its good fastness properties, particularly by its good fastness to ironing, to washing and to light.

6. Fiber dyed with the azo-dyestuffs as claimed in claim 1.

7. Fiber dyed with the azo-dyestuffs as claimed in claim 2.

8. Fiber dyed with the azo-dyestuff as claimed in claim 3.

9. Fiber dyed with the azo-dyestuff as claimed in claim 4.

10. Fiber dyed with the azo-dyestuff as claimed in claim 5.

HANS THOMAE.
AUGUST MODERSOHN.
FRITZ MÜLLER.
FRIEDRICH MUTH.